US008854250B2

(12) United States Patent
Keranen et al.

(10) Patent No.: US 8,854,250 B2
(45) Date of Patent: Oct. 7, 2014

(54) OFF-DIAGONAL ELEMENT ECHO POWER ESTIMATOR FOR POLARIZATION WEATHER RADAR

(75) Inventors: Reino Keranen, Espoo (FI); Chandrasekaran Venkatachalam, Fort Collins, CO (US)

(73) Assignee: Vaisala Oyj, Helsinki (FI)

( * ) Notice: Subject to any disclaimer, the term of this patent is extended or adjusted under 35 U.S.C. 154(b) by 646 days.

(21) Appl. No.: 13/170,994

(22) Filed: Jun. 28, 2011

(65) Prior Publication Data

US 2013/0002475 A1    Jan. 3, 2013

(51) Int. Cl.
  *G01S 13/00*  (2006.01)
  *G01S 13/95*  (2006.01)
  *G01S 7/02*   (2006.01)
  *G01S 7/41*   (2006.01)

(52) U.S. Cl.
  CPC .............. *G01S 7/025* (2013.01); *G01S 13/951* (2013.01); *G01S 7/41* (2013.01)
  USPC .... 342/26 R; 342/26 A; 342/26 B; 342/26 C; 342/26 D; 342/175; 342/188; 342/189

(58) Field of Classification Search
  CPC ....... G01S 13/56; G01S 13/95; G01S 13/951; G01S 13/953; G01S 13/955; G01S 13/956; G01S 13/958; G01S 13/04; G01S 13/5244; G01S 17/95; G01S 7/024
  USPC ........ 342/26 R, 26 A, 26 B, 26 C, 26 D, 175, 342/188, 189
  See application file for complete search history.

(56) References Cited

U.S. PATENT DOCUMENTS

| | | | | |
|---|---|---|---|---|
| 5,764,182 | A * | 6/1998 | Durand | 342/188 |
| 5,990,834 | A * | 11/1999 | Barrick et al. | 342/418 |
| 6,061,013 | A * | 5/2000 | Sauvageot et al. | 342/26 R |
| 6,448,923 | B1 * | 9/2002 | Zrnic et al. | 342/26 R |
| 6,473,026 | B1 * | 10/2002 | Ali-Mehenni et al. | 342/26 R |
| 6,690,333 | B2 * | 2/2004 | Eiges | 343/757 |
| 7,049,997 | B2 * | 5/2006 | Alford et al. | 342/26 R |
| 7,158,071 | B2 * | 1/2007 | Testud et al. | 342/25 R |
| 7,171,175 | B2 * | 1/2007 | Lahti et al. | 455/135 |
| 7,355,546 | B2 * | 4/2008 | Randall | 342/26 R |
| 7,365,696 | B1 * | 4/2008 | Smeltzer | 343/757 |
| 7,439,899 | B2 * | 10/2008 | Stagliano et al. | 342/26 R |
| 7,495,599 | B2 * | 2/2009 | Andersson et al. | 342/26 R |
| 7,554,486 | B2 * | 6/2009 | Walker | 342/174 |
| 7,592,948 | B2 * | 9/2009 | Walker | 342/174 |
| 7,773,029 | B1 * | 8/2010 | Bachman | 342/159 |
| 7,843,378 | B2 * | 11/2010 | Venkatachalam et al. | 342/26 R |
| 7,872,603 | B2 * | 1/2011 | Tillotson | 342/26 B |
| 7,898,459 | B2 * | 3/2011 | Venkatachalam et al. | 342/26 R |

(Continued)

OTHER PUBLICATIONS

International Search Report and Written Opinion of PCT/US2011/042187 mailed on Nov. 3, 2011, 7 pages.

*Primary Examiner* — Peter Bythrow
(74) *Attorney, Agent, or Firm* — Maschoff Brennan (57) ABSTRACT

Embodiments of the invention are directed to improving the sensitivity in polarimetric radar data. In particular, embodiments of the invention improve the sensitivity of such systems with improved post processing techniques. The sensitivity can be improved by using the co-polar elements (off diagonal elements) of the covariance matrix in power and/or reflectivity determinations. This can not only improve the sensitivity but may also enhance identification and improve quantitative estimates of precipitation.

10 Claims, 7 Drawing Sheets

(56) References Cited

U.S. PATENT DOCUMENTS

| | | |
|---|---|---|
| 2007/0152867 A1* | 7/2007 | Randall ........................ 342/26 R |
| 2008/0012755 A1* | 1/2008 | Venkatachalam et al. .. 342/26 R |
| 2009/0295627 A1* | 12/2009 | Venkatachalam et al. .. 342/26 R |
| 2011/0102249 A1* | 5/2011 | Venkatachalam et al. .. 342/26 R |
| 2012/0086596 A1* | 4/2012 | Insanic et al. ............... 342/26 D |

* cited by examiner

OFF-DIAGONAL ELEMENT ECHO POWER ESTIMATOR FOR POLARIZATION WEATHER RADAR

BACKGROUND OF THE INVENTION

Figure 1:
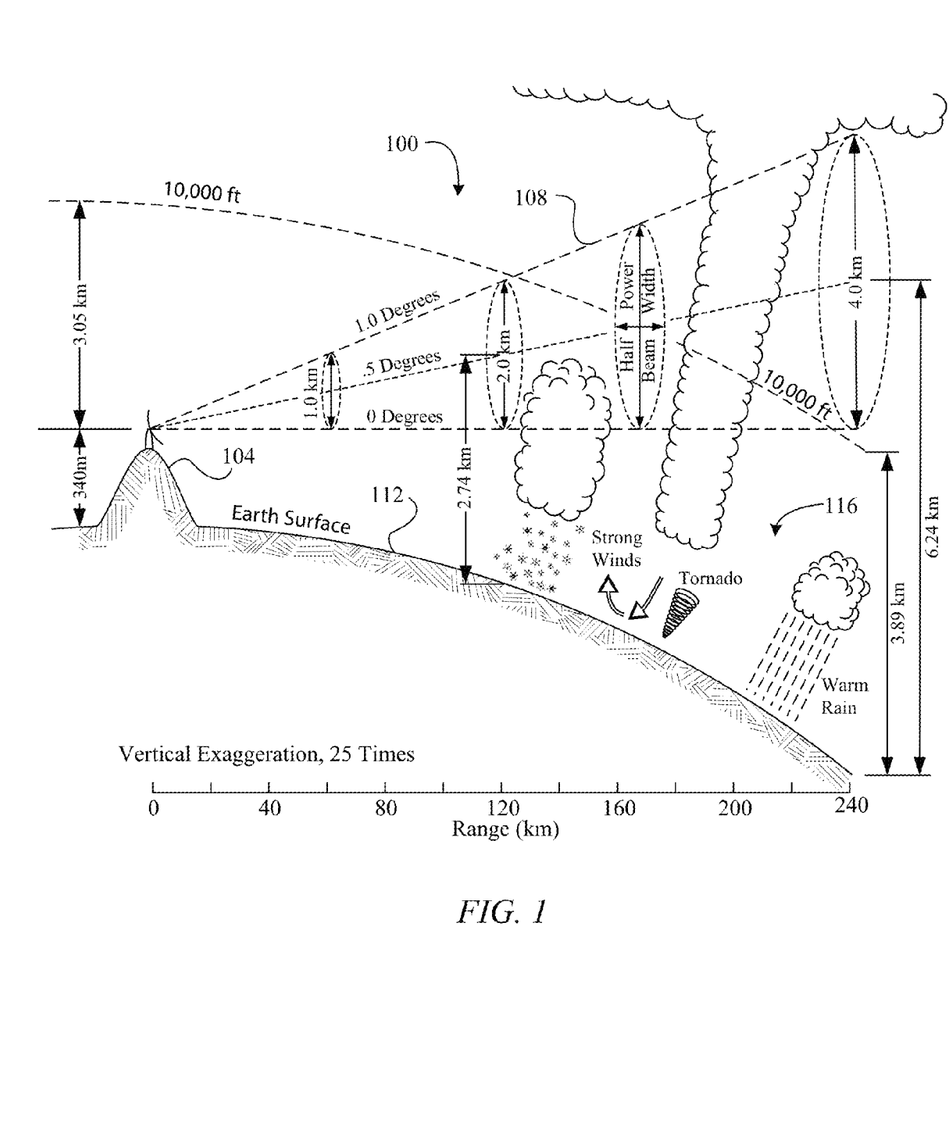
FIG. 1 provides a schematic illustration of the operation of a conventional radar system (reproduced from the National Academy of Sciences Report, "Flash flood forecasting over complex terrain").

One of the fundamental objectives of meteorological radar systems is to sample the atmosphere surrounding the Earth to provide a quantitative measure of precipitation. Conventional meteorological radars provide coverage over long ranges, often on the order of hundreds of kilometers. A general schematic of how such conventional radar systems function is provided in FIG. 1. In this illustration, a radar is disposed at the peak of a raised geographical feature such as a hill or mountain 104. The radar generates an electromagnetic beam 108 that disperses approximately linearly with distance, with the drawing showing how the width of the beam 108 thus increases with distance from the radar. Various examples of weather patterns 116 that might exist and which the system 100 attempts to sample are shown in different positions above the surface 112 of the Earth. The collection of radar data can be subject to various parameters and losses can occur due to noise.

BRIEF SUMMARY OF THE INVENTION

Embodiments of the invention improve the sensitivity of polarimetric radar data. This can be done during post processing or in real time during data collection. The sensitivity can be improved by calculating the reflectivity from a co-polar element (off-diagonal element) of the polarimetric covariance matrix, where the polarimetric covariance matrix is calculated from the complex antenna voltages projected in the horizontal and vertical polarization states.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Embodiments of the invention improve the sensitivity of polarimetric radar data. In particular, embodiments of the invention improve the sensitivity of such systems with improved post processing techniques. This can be done using a co-polar element (off-diagonal element) of the covariance matrix to estimate the power and/or reflectivity of a region of interest. Such practices can also enhance echo identification and improve quantitative estimates of precipitation. Some embodiments of the invention have shown signal improvements by at least 3 dB.

Embodiments of the invention can be implemented in a number of ways. For instance, embodiments of the invention can be used in real-time with a polarimetric radar system or during post processing on previously collected polarimetric radar I/Q data. Embodiments of the invention can be implemented by software.

Figure 2:
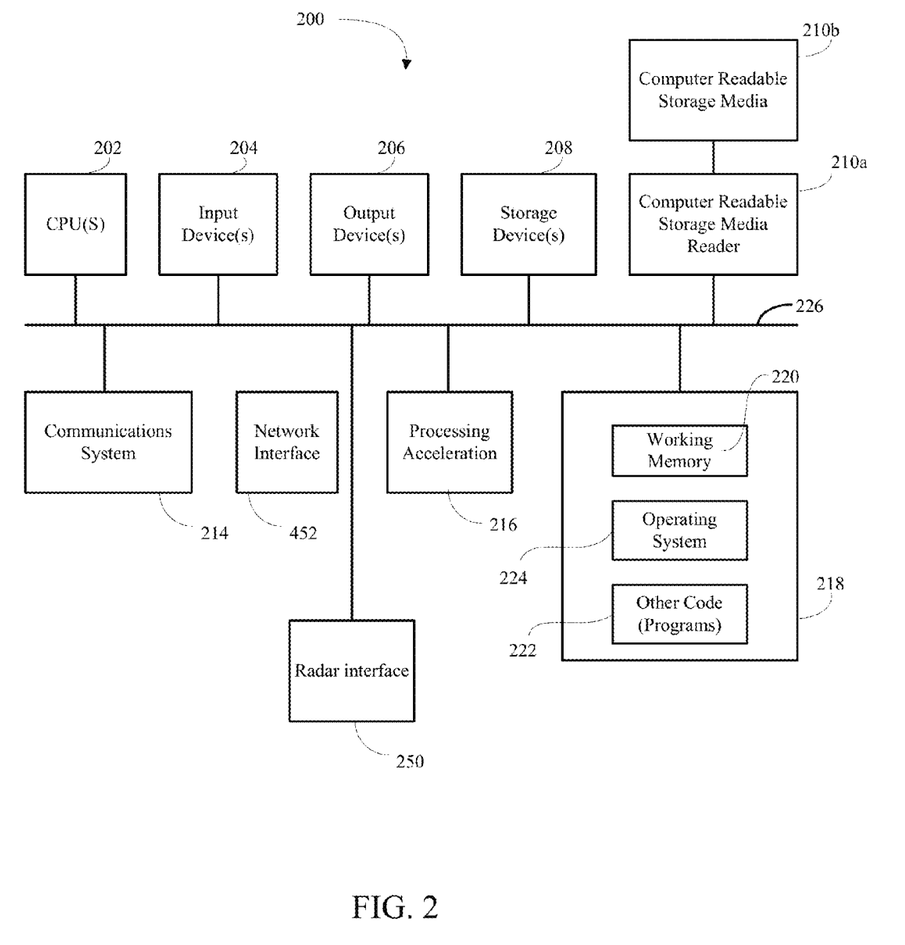
FIG. 2 shows a simplified block diagram of a computational system that can be used to implement embodiments of the invention.

FIG. 2 shows a simplified block diagram of a computer system 200 that can be coupled with a dual polarization radar system for computation of environmental parameters using various embodiments of the invention. Computer system 200 can be used to perform any or all the computations shown in FIG. 3 and/or the equations described herein. The drawing illustrates how individual system elements can be implemented in a separated or more integrated manner. The computer 200 is shown having hardware elements that are electrically coupled via bus 226. Network interface 252 can communicatively couple the computational device 200 with another computer, for example, through a network such as the Internet. The hardware elements can include a processor 202, an input device 204, an output device 206, a storage device 208, a computer-readable storage media reader 210a, a communications system 214, a processing acceleration unit 216 such as a DSP or special-purpose processor, and memory 218. The computer-readable storage media reader 210a can be further connected to a computer-readable storage medium 210b, the combination comprehensively representing remote, local, fixed, and/or removable storage devices plus storage media for temporarily and/or more permanently containing computer-readable information.

Radar interface 250 is coupled with bus 226. In some embodiments, radar interface 250 can be any type of communication interface. For example, radar interface 250 can be a USB interface, UART interface, serial interface, parallel interface, etc. Radar interface 250 can be configured to couple directly with any type of radar system such as a dual polarization radar system.

The computer system 200 also comprises software elements, shown as being currently located within working memory 220, including an operating system 224 and other code 222, such as a program designed to implement methods and/or processes described herein. In some embodiments, other code 222 can include software that provides instructions for receiving dual polarization radar data and manipulating the data according to various embodiments disclosed herein. In some embodiments, other code 222 can include software that can predict or forecast weather events, and/or provide real time weather reporting and/or warnings. Variations can be used in accordance with specific requirements. For example, customized hardware might also be used and/or particular elements might be implemented in hardware, software (including portable software, such as applets), or both. Further, connection to other computing devices such as network input/output devices can be employed.

Figure 3:
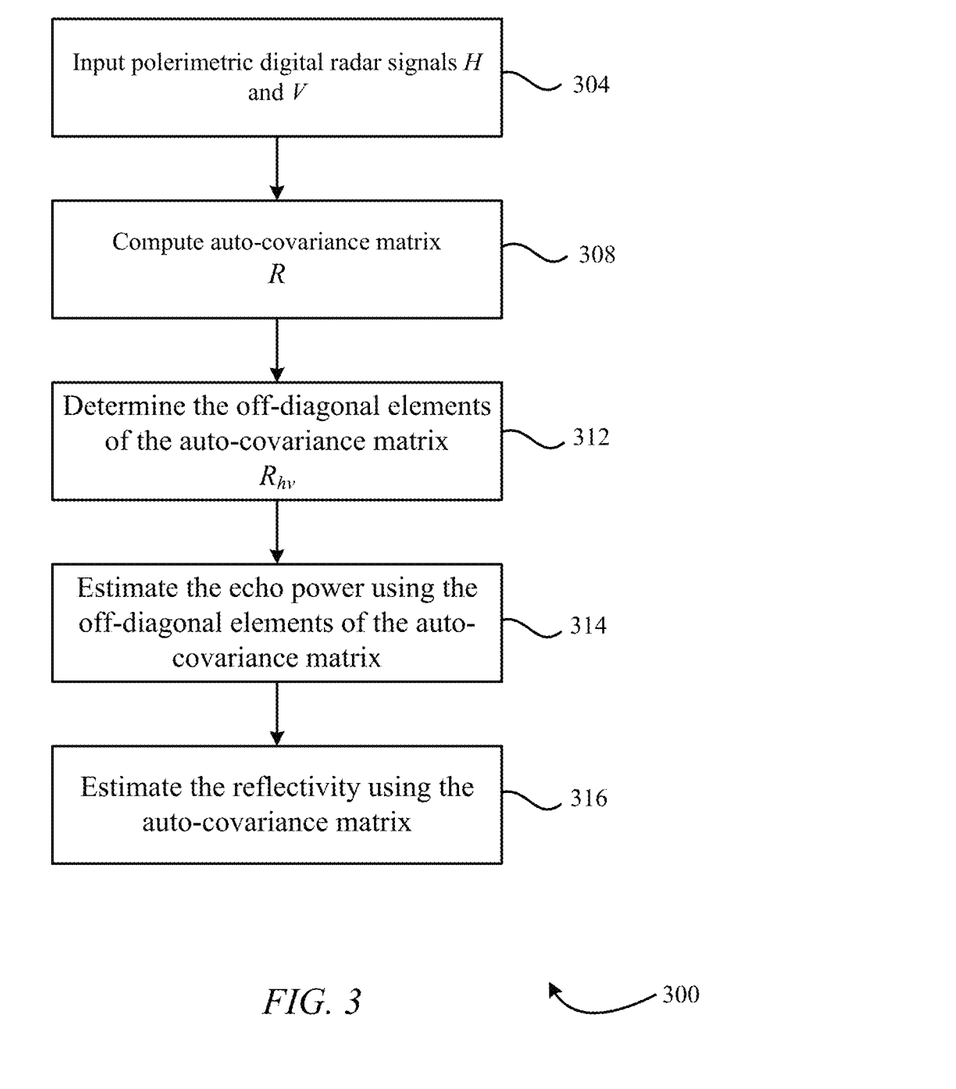
FIG. 3 is a flow chart of a process for determining the precipitation echo power and/or the reflectivity according to some embodiments of the invention.

Embodiments of the invention can be used to estimate the precipitation echo power and/or the reflectivity of a region of interest from dual polarization radar data using the off-diagonal elements of the polarimetric covariance matrix. FIG. 3 is a flowchart of process 300 for estimating the reflectivity using these off-diagonal elements. At block 304 polarimetric digital radar signals, I/Q representing the complex antenna voltages from the horizontal (H) and vertical (V) receiver channels, can be input into the system. These signals can be input from digital radar data stored in an electronic format or in real-time from data being collected from a radar. The covariance matrix, R, can then be calculated at block 308. The co-polar covariance element can be determined at block 312. The co-polar element (off-diagonal element) of the covariance matrix can be labeled $\hat{R}_{hv}$ or $\hat{R}_{vh}$. These two elements are typically equal and can be estimated from the complex signals received in both the horizontal, H, and the vertical, V, polarizations. Therefore $\hat{R}_{hv}$ is used to represent the usage of either off-diagonal element in the embodiment of the invention.

The reflectivity, for example, can be estimated using the co-polar covariance elements at block 316. For example, the reflectivity can be estimated using $$dBZ \cong 10\log\left(|\hat{R}_{hv}| \times \frac{r^2}{C_h(G_{dr})^{1/2}}\right)$$

where $C_h$ and $G_{dr}$, are the radar system calibration constant and differential gains between the two polarization channels, and $|\hat{R}_{hv}|$ represents the off-diagonal co-polar covariance element at range r.

In a dual polarization radar system, the H and V signals are highly correlated in precipitation echo. Because of this high degree of correlation, $\hat{\rho}_{co}$, the absolute value (e.g., modulus) of co-polar covariance element, $R_{hv}$, becomes the logarithmic (geometric) mean of the echo powers in horizontal and vertical polarization, $$\sqrt{P_h P_v} = \frac{|\hat{R}_{hv}|}{|\hat{\rho}_{co}|}$$

where $P_h = \langle |V_h|^2 \rangle$ and $P_v = \langle |V_v|^2 \rangle$ define the echo powers in each polarization. At the limit of high $\rho_{HV}(0)$, the finitely sampled ray estimator $|\hat{R}_{hv}|$ can be unbiased.

The mean power, $P_h$, of the echo signal received in a single polarization of a pulsed weather radar is typically obtained by averaging echo power samples, based on $$P_h = \langle |V_h|^2 \rangle$$

where h refers to the antenna voltages in a definite polarization—typically the horizontal polarization. The mean echo power is related to the radar reflectivity $\eta_h$, which is defined as the average radar cross section of distributed targets in a unit volume of observation:

$$\eta_h = \frac{1}{V} \sum_{i \in V} 4\pi |S_{hh}|_i^2$$

where $S_{hh}$ is the horizontal back-scattering cross-section element of a scatterer in the volume. The relation of mean echo power and $\eta_h$ can be $$P_h = C_h \eta_h / r^2$$

where $C_h$ combines the radar system specific constant features. The dependence on the range of observation (r) includes geometric factors only.

In the context of a dual polarization radar, a signal vector is returned that includes the complex antenna voltages projected in the horizontal, $V_h$, and vertical, $V_v$, polarization states.

$$\begin{bmatrix} V_h(m;n) \\ V_v(m;n) \end{bmatrix}$$

is the $n^{th}$ signal sample vector at gate m in a dual polarization radar. Instead of signal power, the signal now expands into the covariance matrix, R, which has the expectation value $$R = \begin{bmatrix} \langle V_h V_h^* \rangle & \langle V_h V_v^* \rangle \\ \langle V_v V_h^* \rangle & \langle V_v V_v^* \rangle \end{bmatrix}$$

$$= \begin{bmatrix} R_{hh} & R_{hv} \\ R_{vh} & R_{vv} \end{bmatrix}$$

Generally, $R_{hv} = R_{vh}^*$ applies. Using $R_{hh} = P_h = |H|^2$ and $R_{vv} = P_v = |V|^2$, the single polarization radar reflectivity $\eta_h$ can be expanded into a pair of radar reflectivities ($\eta_h, \eta_v$), defined in the horizontal and vertical polarizations $$R_{hh} = C_h \eta_h / r^2$$

$$R_{vv} = C_h G_{dr} \eta_v / r^2$$

in which the common features of the radar calibration constant $C_h$ are reused in the vertical polarization. The adjustment factor $G_{dr}$, accounts for the differential signal gains between the channels H and V. The system adjusted ratio $$G_{dr} \frac{R_{hh}}{R_{vv}} = \frac{\eta_h}{\eta_v} = \frac{|S_{hh}|^2}{|S_{vv}|^2} = Z_{dr}$$

can define the differential reflectivity, which can be sensitive to the effective horizontal vs. vertical axis ratios of the back scatterers.

The absolute value (modulus) of the co-polar covariance element $|R_{hv}|$ also relates to the radar reflectivities in the horizontal and vertical polarizations, too. In particular their geometric mean can be given by $$|R_{hv}| = C_h (G_{dr})^{1/2} (\eta_h \eta_v)^{1/2} / r^2.$$

The voltages from a dual polarization radar can include four significant terms: the horizontal signal H and the noise $n_{h*}$, and the vertical signal V and the noise $n_v$. The co-polar covariance element $R_{hv}$ can be useful because these noise terms are uncorrelated. The co-polar covariance element can then be determined from $$R_{hv} = \begin{bmatrix} R_{hh}^S + P_h^N & R_{hv}^S \\ R_{vh}^{S*} & R_{vv}^S + P_v^N \end{bmatrix}$$

The cross diagonal elements do not contain noise terms. The following properties of white noise expectation values have been utilized $$\langle n_h n_v^* \rangle = \langle n_v n_h^* \rangle = 0$$

$$\langle n_h n_h^* \rangle = P_h^N$$

$$\langle n_v n_v^* \rangle = P_v^N$$

$R_{hh}{}^s$, $R_{vv}{}^s$, and $R_{hv}{}^s$ refer to elements obtained from signal alone.

As shown above, the co-polar covariance element $R_{hv}$ are not affected by white noise. This is in contrast to the legacy power estimator $P_h$ that includes noise. Moreover, these are biased when the noise is significant with respect to the signal. The embodiments of the invention, therefore, use the off-diagonal element of the covariance matrix $R_{hv}$ to calculate the reflectivity. Because noise is not present, the results show improved sensitivity. Given any signal, $|R_{hv}|$ appears insensitive to white noise.

Figure 4:
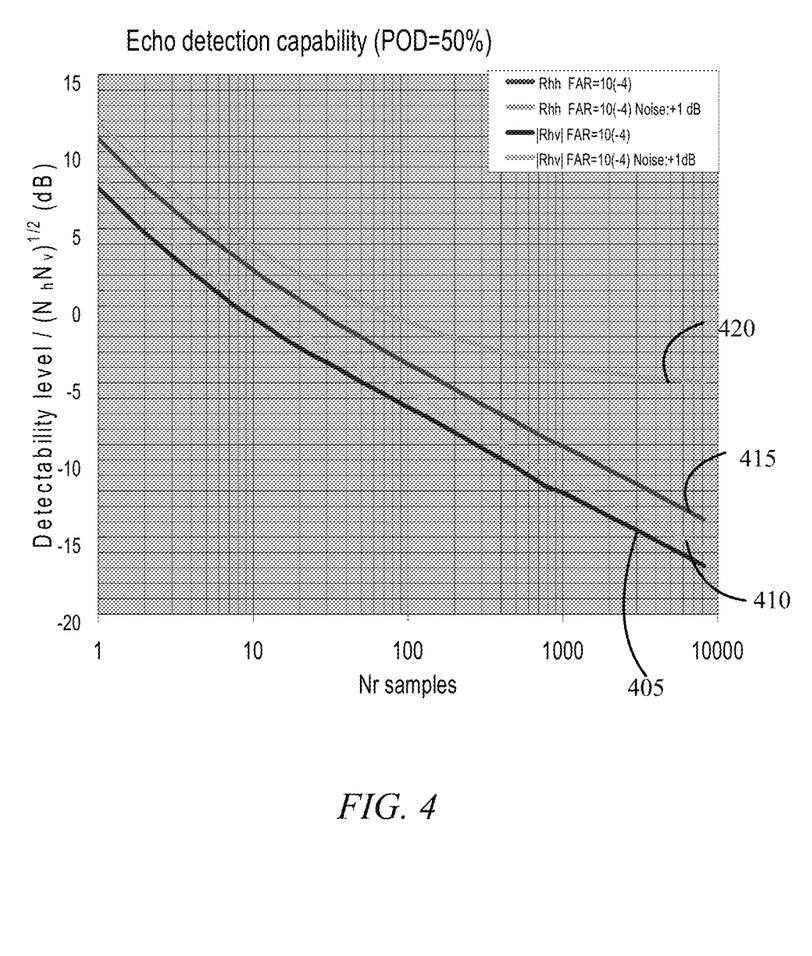
FIG. 4 is a graph showing the mean sensitivity improvements that can result by implementing the embodiments of this invention.

FIG. 4 is a comparison of the detection capabilities using $\hat{R}_{hh}$ and $|\hat{R}_{hv}|$ based echo power estimators as a function of samples. The probability of detection is 50% and false alarm rate $10^{-4}$. Green line 415 and blue line 405 are the detection capabilities of the $\hat{R}_{hh}$ and $|\hat{R}_{hv}|$ echo power estimators in ideal conditions. Orange line 420 and light blue line 410 represent the detection capabilities in typical operational settings where a Signal to Noise/Noise thresholding ratio of 1 dB is set due to variability in the noise background.

In precipitation where $P_H$ and $P_V$ are highly correlated in range, shown by smooth co-polar correlation data, adjacent range gates I/Q data, $\overline{M}$, from same pulse sample may be summed leading to $|\overline{\hat{R}_{hv}(r)}|$.

The co-polar covariance element can be estimated through a sequence of N pulses at $m^{th}$ range index location $$|\hat{R}_{hv}(m)| = \frac{1}{N(2M-1)}\left|\sum_{i=0}^{N-1}\sum_{j=m-M}^{m+M} V_h^*(i,j)V_v(i,j)\right|$$

One advantage of the estimator $\hat{R}_{hv}(m)$ is that it can be summed through local gates providing additional averaging, further reducing the apparent finite noise floor of $\hat{R}_{hv}$.

The estimator value, $|\overline{\hat{R}_{hv}(r)}|$, can be related to the logarithmic mean of the reflectivity factors $\eta_h$ and $\eta_v$, observed in a local interval at distance r.

$$|\hat{R}_{hv}| = C_h(G_{dr})^{1/2}\frac{(\eta_h\eta_v)^{1/2}}{r^2}$$

This estimator, $|\overline{\hat{R}_{hv}(r)}|$, can lead to significantly improved signal-to-noise ratios. It can be used to recover and/or exceed the initial loss of 3 dB due power splitting, for typical operational settings. Using settings optimized for far distance echo, polarimetric radar can detect weak far distance precipitation at with a sensitivity that is more than factor of ten better than that obtained by the legacy method in single polarization.

Figure 5:
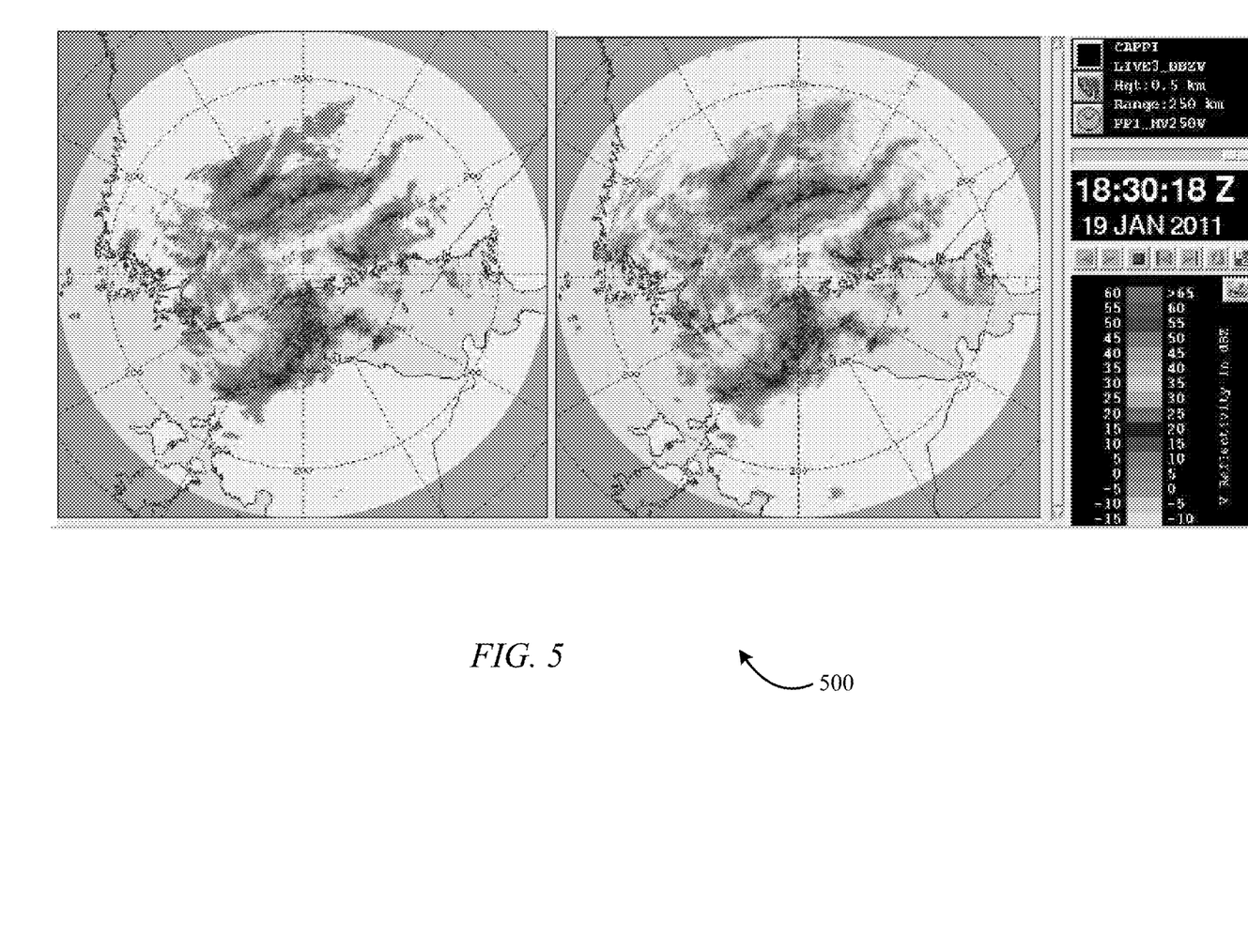
FIG. 5 is a graph showing the observed mean reflectivity and noise expectation values from a single radial using conventional techniques and the embodiments of this invention.

FIG. 5—compares the reflectivity derived from $\hat{R}_{hh}$ and $\hat{R}_{hv}$ based echo power estimators from radar observations and the corresponding expected noise thresholds. The dashed lines are the expected noise floor for the current state of art $\hat{R}_{hh}$ and $\hat{R}_{hv}$ using N samples and m range gates. The sensitivity increase of $|\hat{R}_{hv}|$ reflectivity is apparent.

Figure 6:
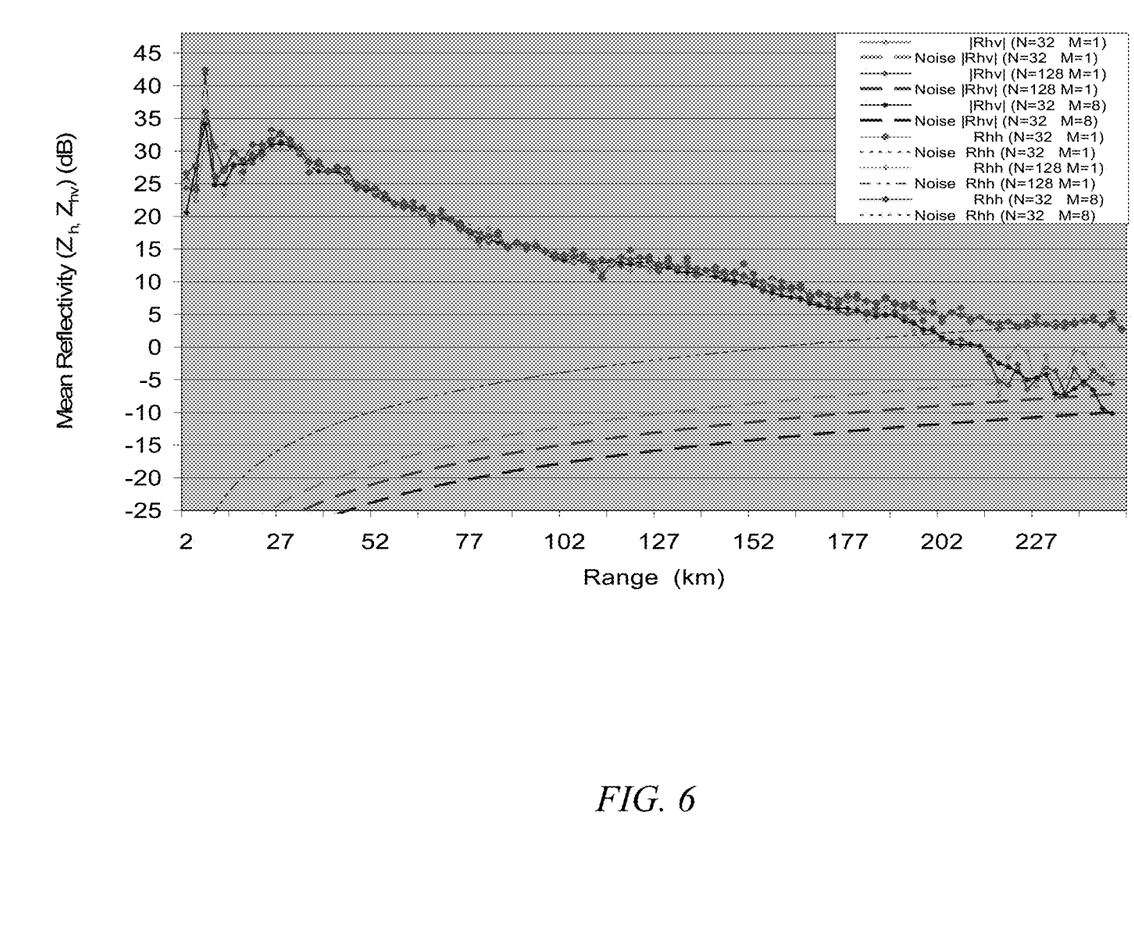
FIG. 6 is a side-by-side comparison of radar profiles analyzed using conventional techniques and embodiments of the invention.

FIG. 6 is a side-by-side comparison of radar display images using conventional techniques and embodiments of the invention. The image on the right was developed using embodiments described herein. The improved sensitivity is evident in the additional information included in the right image.

Figure 7:
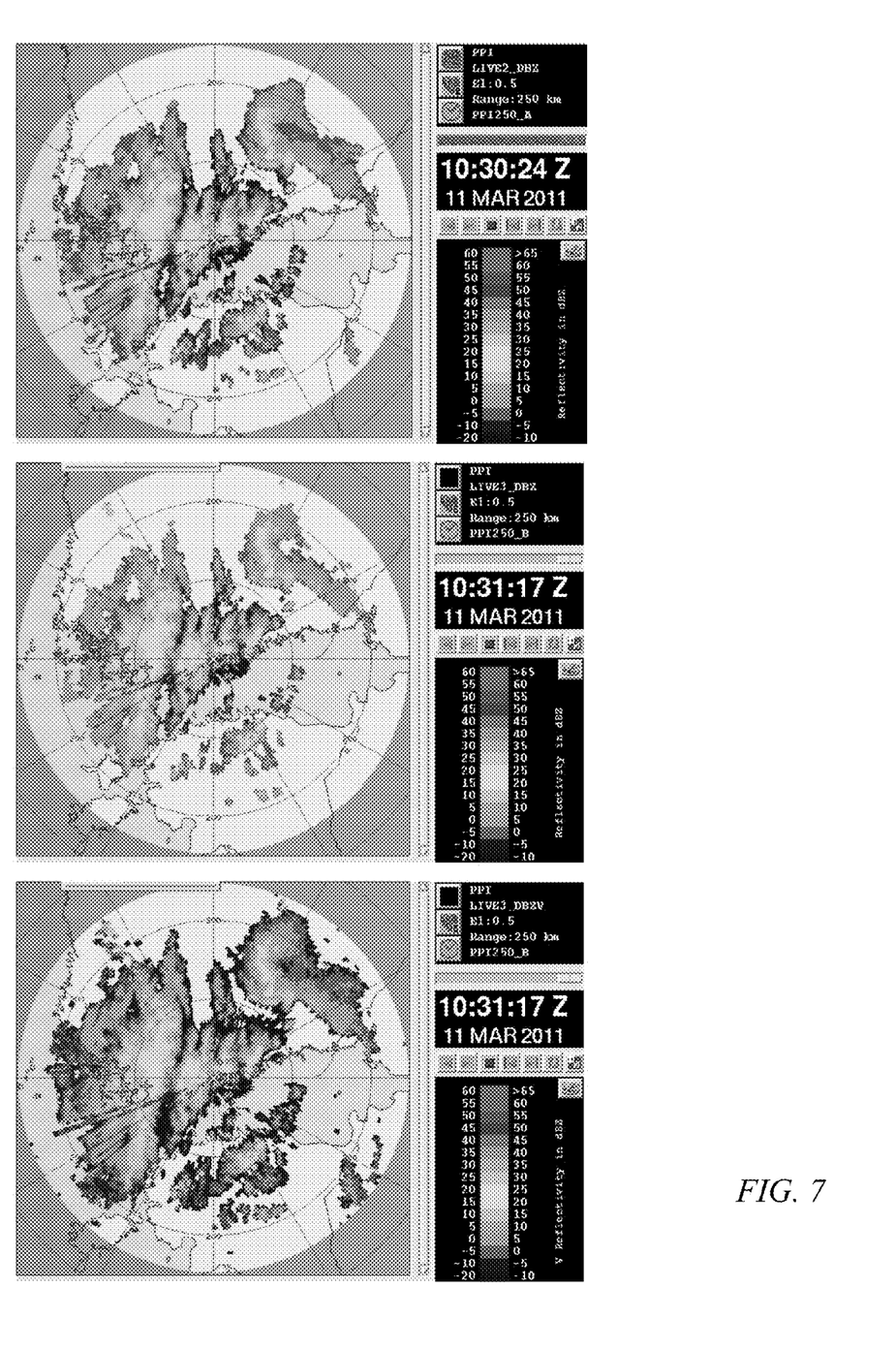
FIG. 7 shows comparisons of echo detection profiles using embodiments of the invention and various conventional techniques.

FIG. 7 shows radar observations using various techniques. The first image is taken from dual polarization radar transmitting full power horizontal polarization only. The second radar observation is taken a few moments later by a simultaneous transmit and receive mode (STAR) dual polarization radar where transmit power is split between the horizontal and vertical polarizations. The 3 dB loss in sensitivity compared to the previous images caused by splitting the transmit power into two polarization states is obvious. The last image is the same STAR mode radar observation as in the middle image but using the techniques described in this invention (n=64, m=16). The +10 dB sensitivity gain using this processing technique is evident in the bottom image.

What is claimed is:

1. A method comprising:
    propagating a radar signal into a region of interest using a dual polarization radar transmitter;
    collecting dual polarization radar echo data scattered form within the region of interest, wherein the radar echo data comprises horizontal and vertical complex voltages;
    calculating, using an electronic computer processor, a covariance matrix from the radar echo data; and
    estimating, using an electronic computer processor, precipitation profiles from an off-diagonal element of the covariance matrix.

2. The method according to claim 1, wherein the covariance matrix is the product of the horizontal complex voltages and vertical complex voltages.

3. The method according to claim 1, wherein the precipitation profile is estimated from the absolute power of the off-diagonal element of the covariance matrix.

4. The method according to claim 1 further comprising estimating a reflectivity from the covariance matrix.

5. The method according to claim 4, wherein the reflectivity is estimated using $$dBZ \cong 10\log\left(|\hat{R}_{hv}|\times\frac{r^2}{C_h(G_{dr})^{1/2}}\right),$$

where $|\hat{R}_{hv}|$ is the covariance matrix, $r^2$ is a mean radial distance, $C_h$ and $G_{dr}$ are calibration constants.

6. A method comprising:
    propagating a radar signal into a region of interest using a dual polarization radar transmitter;
    collecting dual polarization radar data scattered form within the region of interest, wherein the radar data comprises horizontal and vertical complex voltages;
    calculating a covariance matrix from the dual polarization radar data; and
    estimating a reflectivity from an off-diagonal element of the covariance matrix.

7. The method according to claim 6, wherein the reflectivity is estimated from $$dBZ \cong 10\log\left(|\hat{R}_{hv}|\times\frac{r^2}{C_h(G_{dr})^{1/2}}\right),$$

where $|\hat{R}_{hv}|$ is the covariance matrix, $r^2$ is the mean radial distance, $C_h$ and $G_{dr}$ are calibration constants.

8. A radar system comprising:
    a transmitter configured to transmit polarized radar signals into a region of interest;
    a receiver configured to receive a polarized data scattered from the region of interest, wherein the polarized data comprises horizontal and vertical complex voltages; and
    a computer system coupled at least with the receiver, wherein the computer system is configured to calculate a covariance matrix of the polarized data and estimate a reflectivity of the region of interest using an off-diagonal element of the covariance matrix.

9. The radar system according to claim 8, wherein the reflectivity is estimated from the absolute power of an off-diagonal element of the covariance matrix.

10. The radar system according to claim 8, wherein the reflectivity is estimated using $$dBZ \cong 10\log\left(|\hat{R}_{hv}| \times \frac{r^2}{C_h(G_{dr})^{1/2}}\right),$$

where $|\hat{R}_{hv}|$ is the co-polar element of the covariance matrix, $r^2$ is the mean radial distance, $C_h$ and $G_{dr}$ are calibration constants.

* * * * *